(12) United States Patent
Tobita et al.

(10) Patent No.: US 8,843,593 B2
(45) Date of Patent: Sep. 23, 2014

(54) INFORMATION DISTRIBUTION SYSTEM, INFORMATION PROCESSING SERVER, DISTRIBUTION SERVER, COMMUNICATION APPARATUS, PROGRAM AND INFORMATION DISTRIBUTION METHOD

(75) Inventors: Naoto Tobita, Tokyo (JP); Shigeki Wakasa, Kanagawa (JP); Hiroaki Yamada, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 1440 days.

(21) Appl. No.: 12/100,074

(22) Filed: Apr. 9, 2008

(65) Prior Publication Data
US 2008/0263127 A1 Oct. 23, 2008

(30) Foreign Application Priority Data

Apr. 13, 2007 (JP) ................. 2007-106585

(51) Int. Cl.
G06F 15/16 (2006.01)
G06F 17/30 (2006.01)

(52) U.S. Cl.
CPC .............................. G06F 17/30861 (2013.01)
USPC .......... 709/219; 709/203; 709/217; 709/218; 709/229

(58) Field of Classification Search
CPC .................................................. H04L 49/109
USPC .................. 709/203, 217–219, 229
See application file for complete search history.

(56) References Cited

U.S. PATENT DOCUMENTS

| 6,263,437 | B1 * | 7/2001 | Liao et al. ..................... 713/169 |
| 7,620,822 | B2 * | 11/2009 | Akashika et al. ............. 713/190 |
| 7,720,981 | B2 * | 5/2010 | Nomura et al. ............... 709/229 |
| 8,291,085 | B2 * | 10/2012 | Shiigi et al. ................... 709/227 |
| 2002/0026577 | A1 * | 2/2002 | Futamura et al. ............ 713/156 |
| 2002/0183045 | A1 * | 12/2002 | Emmerson et al. .......... 455/412 |
| 2004/0015560 | A1 * | 1/2004 | Yamaguchi et al. .......... 709/217 |
| 2004/0153559 | A1 * | 8/2004 | Kikuchi et al. ............... 709/229 |
| 2005/0044245 | A1 * | 2/2005 | Hoshina ....................... 709/229 |
| 2005/0114619 | A1 * | 5/2005 | Matsuo et al. ................ 711/170 |
| 2006/0020706 | A1 * | 1/2006 | Kamiya et al. ............... 709/229 |
| 2008/0254780 | A1 * | 10/2008 | Kuhl et al. .................... 455/418 |

FOREIGN PATENT DOCUMENTS

| JP | 8-168965 | 7/1996 |
| JP | 10-020780 | 1/1998 |

(Continued)

OTHER PUBLICATIONS

Conti, J.P.; Charge it to my phone; Dec./Jan. 2005/2006; IEEE, Communications Engineer, vol. 3, Issue: 6, pp. 34-37.*

*Primary Examiner* — Hieu Hoang
*Assistant Examiner* — Angela Widhalm
(74) *Attorney, Agent, or Firm* — Finnegan, Henderson, Farabow, Garrett & Dunner, L.L.P.

(57) ABSTRACT

There is provided a communication apparatus including an identification data generation portion to generate identification data, an identification data storage portion to store the identification data generated by the identification data generation portion, a basic data reception portion to receive basic data from an information processing server through a given communication path, the basic data containing prescribed first data specifying service data generated in the distribution server and containing data to be used in an IC chip capable of contactless communication with a reader/writer, and prescribed identification data, and a data acquisition portion to acquire the service data generated based on the basic data in the distribution server from the distribution server if the prescribed identification data matches with the identification data stored in the identification data storage portion.

8 Claims, 12 Drawing Sheets

(56) References Cited

FOREIGN PATENT DOCUMENTS

| | | |
|---|---|---|
| JP | 2002-074500 | 3/2002 |
| JP | 2006-107368 | 4/2006 |
| JP | 2006-113646 | 4/2006 |
| JP | 2006-148697 | 6/2006 |
| JP | 2006-211223 | 8/2006 |

* cited by examiner

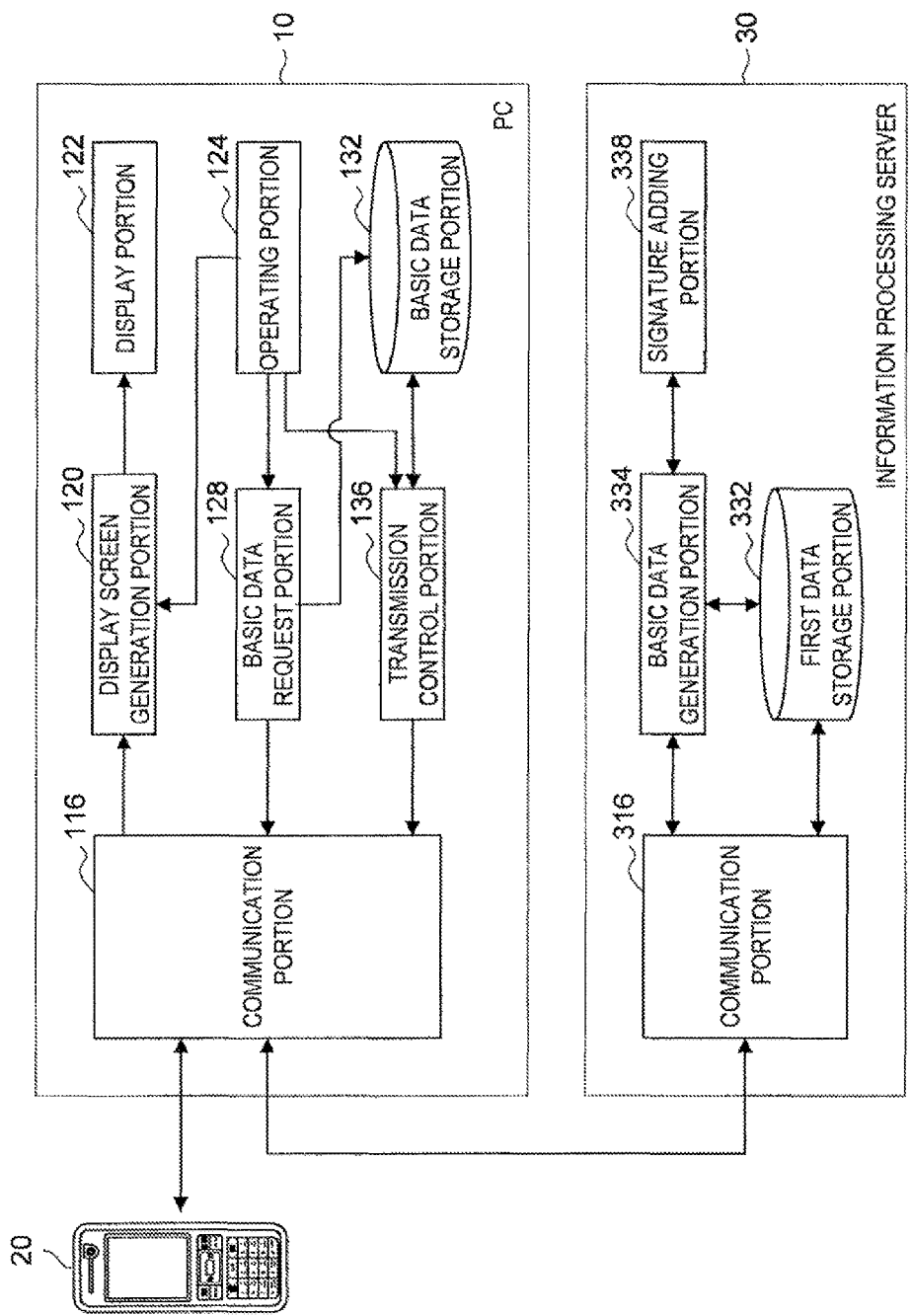

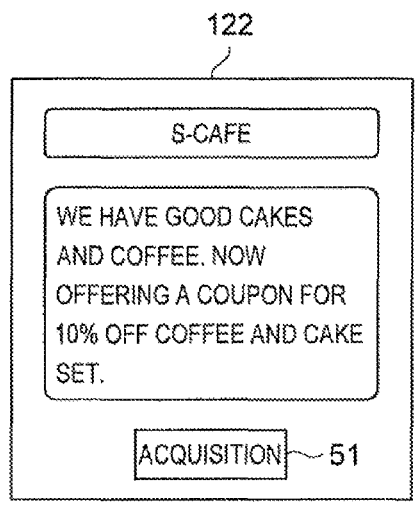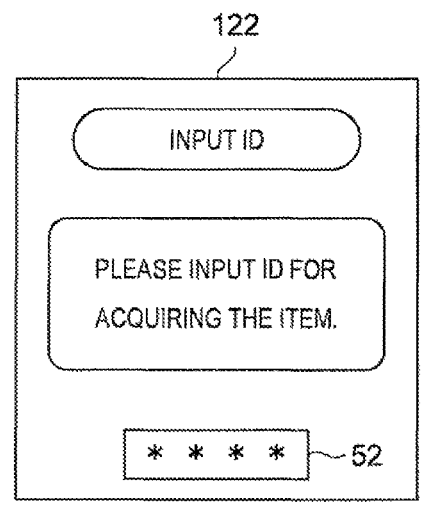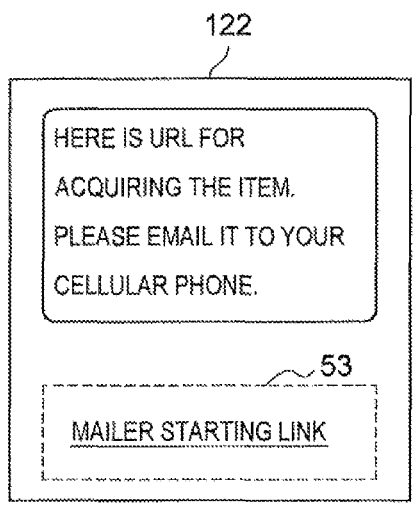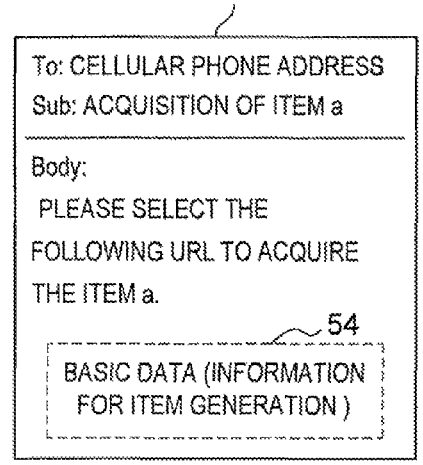

FIG.7

BASIC DATA

```
<a href="
61 — teikyouserver.jp?
62 — C=000001 0024 C 1&
63 — F=303E400A &
64 — t=<SPECIAL COUPON>&
65 — d=CAKE SET A  10% OFF&
66 — p=0901&
67 — s=mrchfeik&
">
```

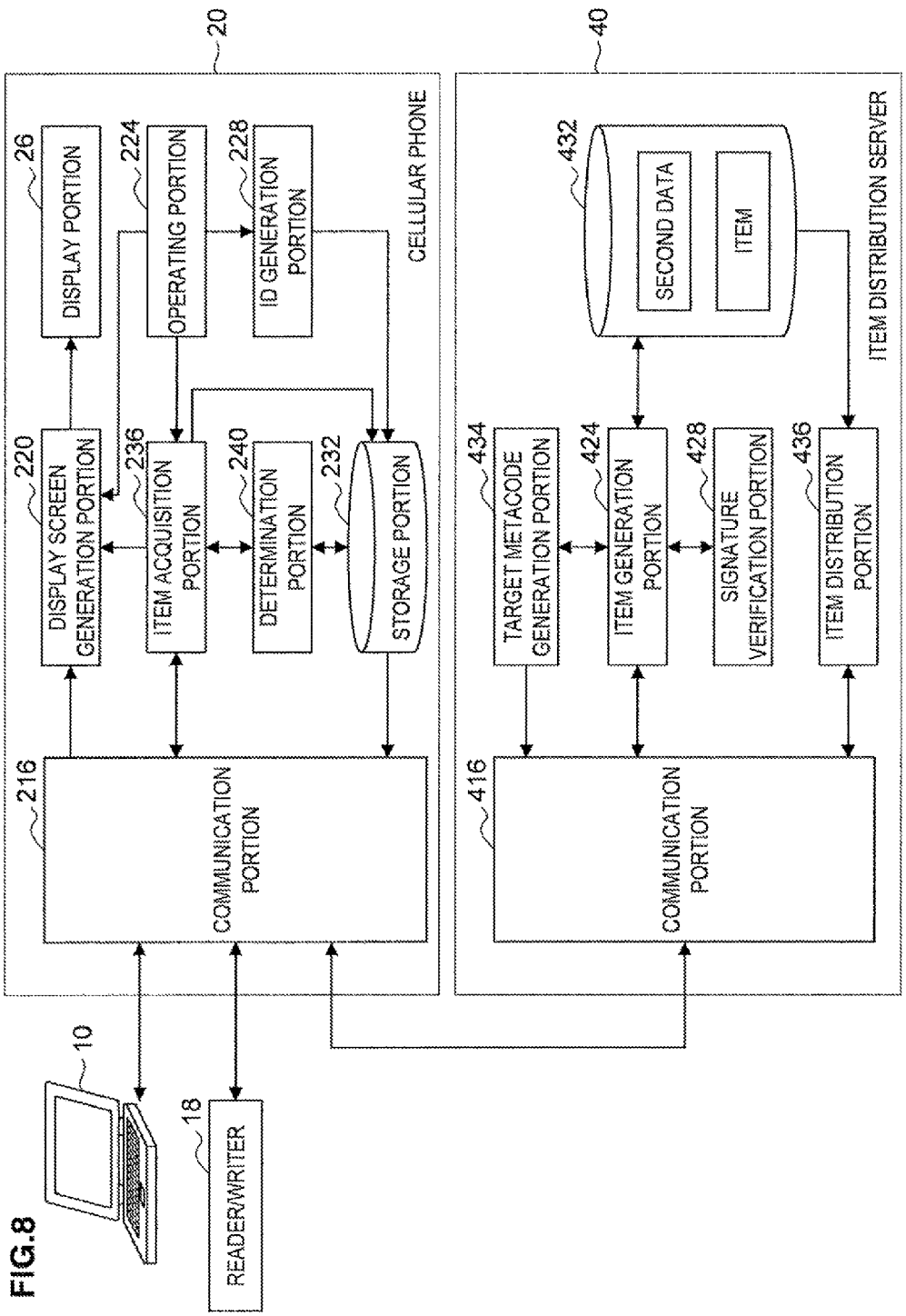

FIG.9

```
<?wat version="1.0"?>
<SP>
<ID>000001</ID>
<company name>S-CAFE</company name>
<service name>COUPON SERVICE</service name>
<description>OFFERING DISCOUNT COUPON</description>
<F encode>
<data>
<f>303E400A</f>
<lim>1</lim>
</data>
<Viewer>
<data><size>6</size>
<encode>JAPANESE</encode>
<caption><SPECIAL COUPON></caption>
</data>
<data><size>6</size>
<encode>JAPANESE</encode>
<caption>CAKE SET A  10% OFF</caption>
</data>
<data>
<img src="image/cake_set_a.gif">
</data>
</Viewer>
</F encode>
</SP>
```

FIG.10

```
<object declare id="application.name" data="date1"       ~71
        type="type1">
<program name="tgmc" value="pM1FGkq">                    ~72
<param name="felipass" value="0901">                     ~73
</object>
```

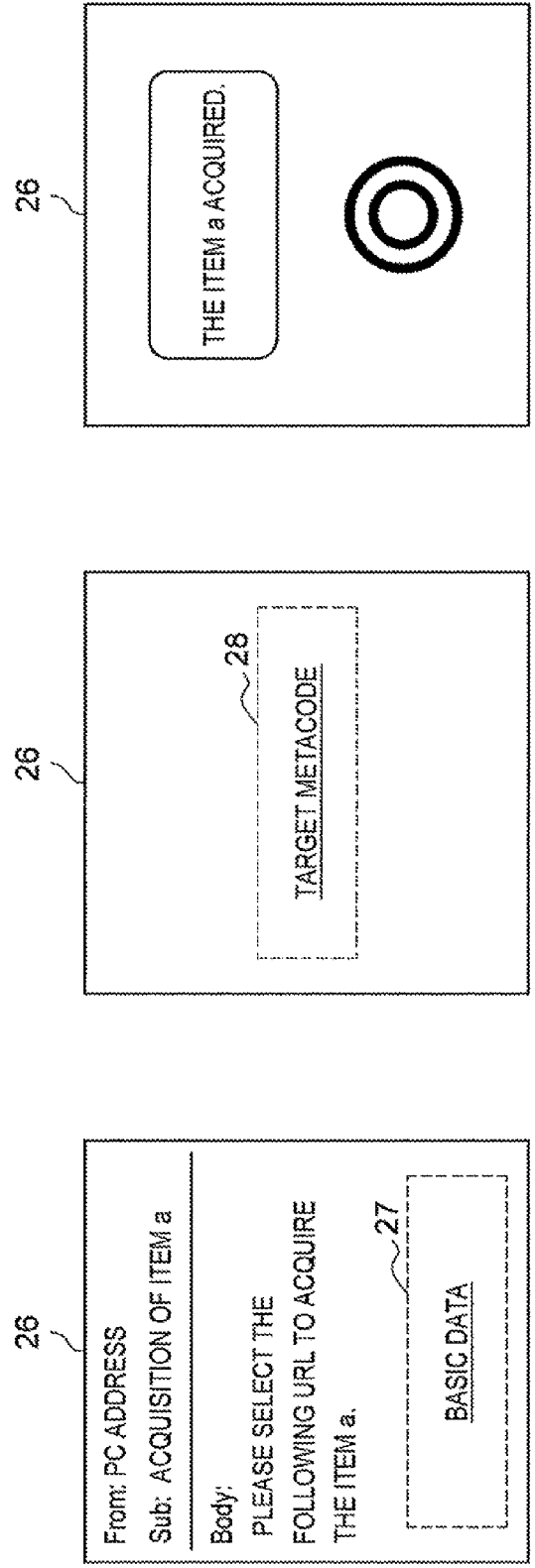

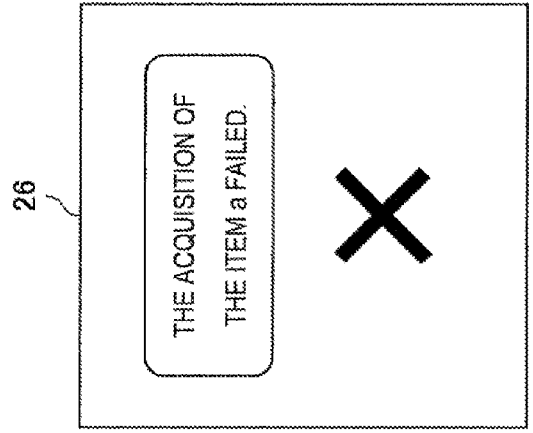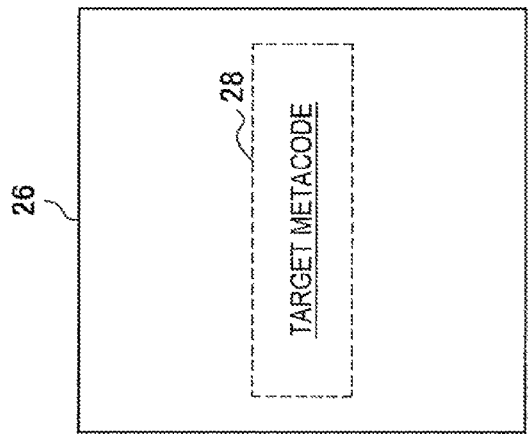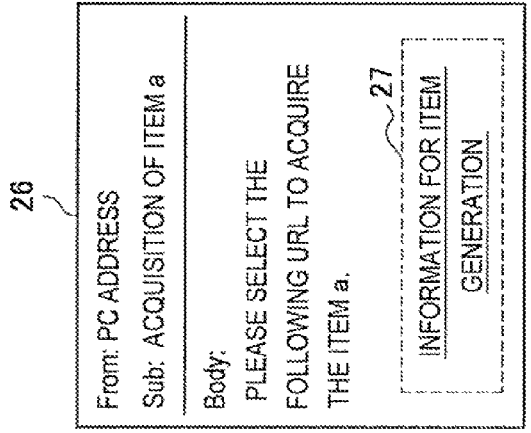

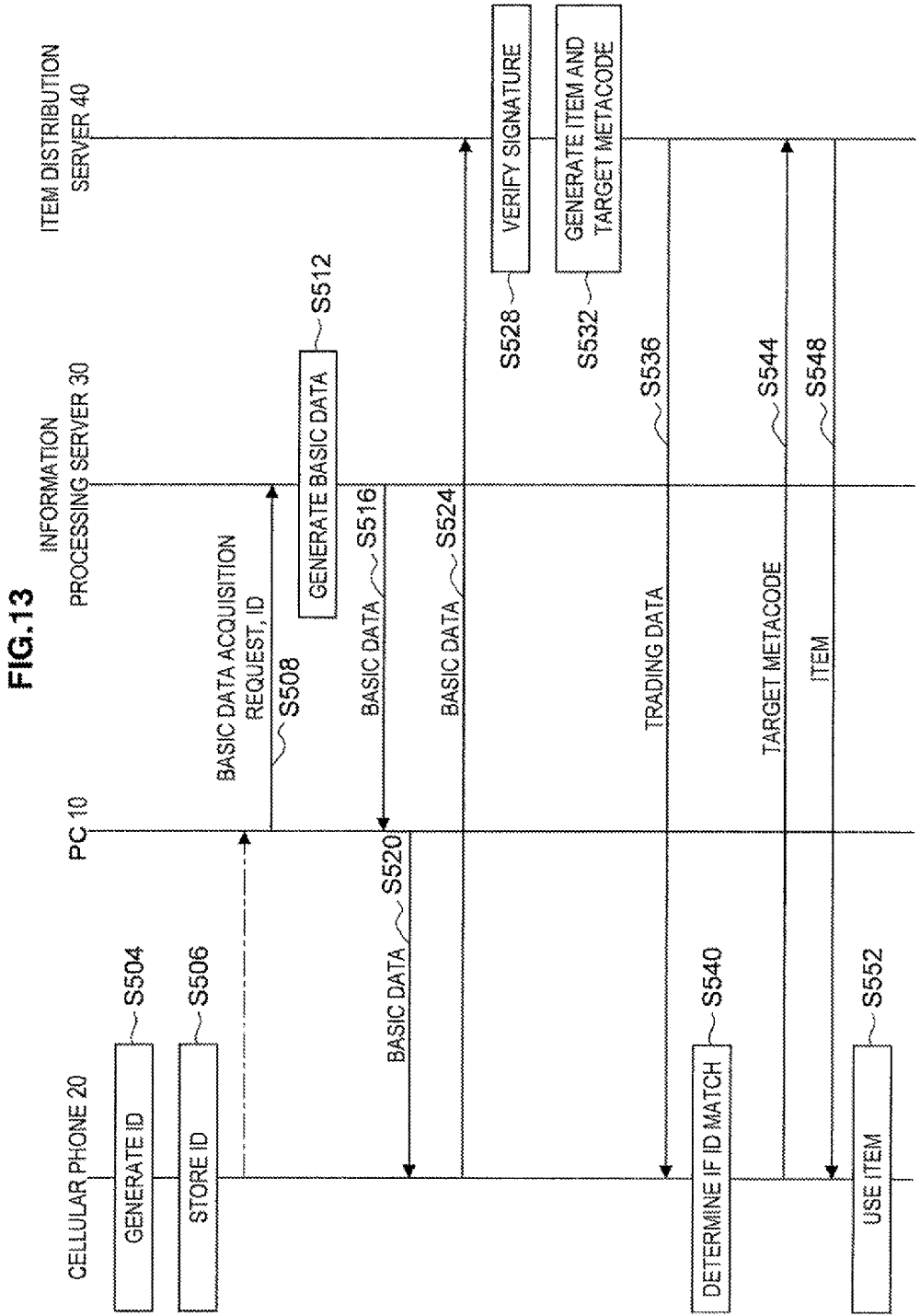

US 8,843,593 B2

INFORMATION DISTRIBUTION SYSTEM, INFORMATION PROCESSING SERVER, DISTRIBUTION SERVER, COMMUNICATION APPARATUS, PROGRAM AND INFORMATION DISTRIBUTION METHOD

CROSS REFERENCES TO RELATED APPLICATIONS

The present invention contains subject matter related to Japanese Patent Application JP 2007-106585 filed in the Japan Patent Office on Apr. 13, 2007, the entire contents of which being incorporated herein by reference.

BACKGROUND OF THE INVENTION

1. Field of the Invention

The present invention relates to an information distribution system, an information processing server, a distribution server, a communication apparatus, a program and an information distribution method.

2. Description of the Related Art

A communication apparatus which is capable of contactlessly communicating with a reader/writer, such as a cellular phone with a contactless IC (Integrated Circuit) card or IC chip, has been widely used recently.

If the communication apparatus capable of contactless communication with a reader/writer has a tamper resistant IC chip or the like, it is possible to perform secure communication of data which needs protection against tampering such as electronic money and ticket, data which needs protection against information leakage such as credit card numbers, and data which is related to personal information such as membership numbers. Consequently, the distribution of various services with the use of the communication apparatus which is capable of contactless communication with a reader/writer is widespread socially. A method of authentication between a reader/writer and a communication apparatus is disclosed in Japanese Unexamined Patent Application Publication No. 8-168965, for example.

Service data which is used in an IC chip such as a ticket and a coupon can be distributed to a communication apparatus from an information processing server of each business through a given communication path.

SUMMARY OF THE INVENTION

However, in terms of system management, there has been a need to perform the distribution of service data to a communication apparatus only from a prescribed distribution server. In view of such a need, there is proposed a system in which an information processing server of each business transmits basic data which specifies service data to a communication apparatus, the communication apparatus transmits the basic data to a distribution server as a request for acquiring the service data, and the distribution server distributes the service data which is specified by the basic data to the communication apparatus.

In such a system, it is necessary to ensure that a communication apparatus to receive service data from a distribution server is the communication apparatus to which an information processing server of each business intends to deliver service data, which is, the validity of a communication apparatus. Although there is a method of ensuring the validity of a communication apparatus which requests the acquisition of service data by performing communication between each information processing server and a distribution server, this method requires the establishment of a secure communication path between each information processing server and a distribution server, which can hamper the proliferation of the above system.

In light of the foregoing, there is a need for new, improved information distribution system, information processing server, distribution server, communication apparatus, program and information distribution method which enable the distribution of service data to a particular communication apparatus only without the need for communication between the information processing server and the distribution server.

According to an embodiment of the present, invention, there is provided an information distribution system which includes a communication apparatus having an IC chip capable of contactless communication with a reader/writer, an information processing server to transmit first data for generating service data containing data to be used in the IC chip, and a distribution server to generate and distribute the service data to the communication apparatus. The information processing server includes a reception portion to receive a request for transmitting prescribed first data containing the data to be used in the IC chip and specifying the service data generated in the distribution server, and prescribed identification data, a basic data generation portion to generate basic data containing the requested first data and the prescribed identification data, and a transmission portion to transmit the basic data generated by the basic data generation portion.

The distribution server includes a second data storage portion to store second data, a service data generation portion to generate service data containing one or more than one second data specified by the first data contained in the basic data transmitted from the transmission portion, and the data to be used in the IC chip contained in the first, data, and a data communication portion capable of distributing the service data generated by the service data generation portion to the communication apparatus.

The communication apparatus includes an identification data generation portion to generate identification data, an identification data storage portion to store; the identification data generated by the identification data generation portion, a determination portion to determine whether the prescribed identification data matches with the identification data stored in the identification data storage portion, and a data acquisition portion to acquire the service data generated by the service data generation portion from the data communication portion if the determination portion determines that the prescribed identification data matches with the identification data stored in the identification data storage portion.

In this configuration, the data acquisition portion can acquire the service data, which is generated based on the first data in the distribution server if the determination portion determines that the identification data which is transmitted together with the first data transmission request to the information processing server matches with the identification number which is generated by the identification data generation portion of the communication apparatus. On the other hand, if the determination portion determines that the identification data which is transmitted to the information processing server is different from the identification data which is generated by the identification number generation portion of the communication apparatus, the communication apparatus fails to acquire the service data, from the distribution server.

Thus, only the communication apparatus which generates and stores the identification data that is transmitted together with the first, data transmission request to the information processing server can acquire the service data which is generated based on the first, data from the distribution server. The information distribution system can thereby distribute the service data to the particular communication apparatus only without communication between the information processing server and the distribution server.

In the above information distribution system, the basic data generation portion may add a signature to prove validity of at least the prescribed identification data to the basic data, the distribution server may further include a signature verification portion to verily validity of the prescribed identification data based on the signature added to the basic data, and the service data generation portion may generate the service data if the signature verification portion verifies that the prescribed identification data is valid.

In this configuration, the signature verification portion checks the validity of the prescribed identification data as to whether the prescribed identification data which is contained in the basic data has been tampered or the like and, if the signature verification portion verifies the validity of the prescribed identification data, the service data generation portion generates the service data based on the first, data which is contained in the basic data. Therefore, the service data is not generated if the identification data, which is contained in the basic data has been tampered, thereby reliably preventing the service data from being distributed to the communication apparatus which the information processing server does not intend to.

In the above information distribution system, the communication apparatus may include a basic data reception portion to receive the basic data transmitted from the transmission portion through a given communication path, and a basic data transmission portion to transmit the basic data received by the basic data reception portion to the distribution server, and the service data generation portion may generate the service data and trading data indicating the service data and containing the prescribed identification data based on the basic data received from the transmission portion through the communication apparatus. Further, the data communication portion may distribute the trading data generated by the service data generation portion to the communication apparatus, the determination portion may determine whether the prescribed identification data contained in the trading data distributed from the communication apparatus matches with the identification data stored in the identification data storage portion, and the data acquisition portion may transmit the trading data to the distribution server if the determination portion determines that the prescribed identification data matches with the identification data stored in the identification data storage portion. Furthermore, the data communication portion may receive the trading data, from the data acquisition portion and distribute service data indicated by the trading data to the communication apparatus.

According to another embodiment of the present invention, there is provided an information processing server which includes a reception portion to receive a request for transmitting prescribed first data specifying service data generated in a distribution server and distributed to a communication apparatus and containing data to be used in an IC chip capable of contactless communication with a reader/writer, and prescribed identification data, a basic data generation portion to generate basic data containing the requested first data and the prescribed identification data, and a transmission portion to transmit the basic data generated by the basic data generation portion, wherein the service data generated based on the basic data in the distribution server is distributed to the communication apparatus if the identification data generated in the communication apparatus matches with the prescribed identification data.

According to another embodiment of the present invention, there is provided a distribution server to generate service data containing data to be used in an IC chip capable of contactless communication with a reader/writer and distribute the service data to a communication apparatus, which includes a data communication portion to receive basic data transmitted from an information processing server, the basic data containing first data containing the data to be used in the IC chip and specifying the service data, and prescribed identification data, a second data storage portion to store second data, and a service data generation portion to generate service data containing one or more than one second data specified by the first data contained in the basic data received by a reception portion and the data, to be used in the IC chip contained in the first data, wherein the service data generated by the service data generation portion is distributed from the data communication portion to the communication apparatus if the identification data, generated in the communication apparatus matches with the prescribed identification data.

According to another embodiment of the present invention, there is provided a communication apparatus capable of communication with, a distribution server to generate service data, which includes an identification data generation portion to generate identification data, an identification data storage portion to store the identification data generated by the identification data generation portion, a basic data reception portion to receive basic data from an information processing server through a given communication path, the basic data containing prescribed first data specifying service data generated in the distribution server and containing data to be used in an IC chip capable of contactless communication with a reader/writer, and prescribed identification data, a determination portion to determine whether the prescribed identification data matches with the identification data stored in the identification data storage portion, and a data acquisition portion to acquire the service data generated based on the basic data in the distribution server from the distribution server if the determination portion determines that the prescribed identification data matches with the identification data stored in the identification data storage portion.

According to another embodiment, of the present invention, there is provided a program for causing a computer to serve as an information distribution system which includes a communication apparatus having an IC chip capable of contactless communication with a reader/writer, an information processing server to transmit, first data for generating service data containing data to be used in the IC chip, and a distribution server to generate and distribute the service data to the communication apparatus, wherein the information processing server includes a reception portion to receive a request for transmitting prescribed first data containing the data to be used in the IC chip and specifying the service data generated in the distribution server, and prescribed identification data, a basic data generation portion to generate basic data containing the requested first data and the prescribed identification data, and a transmission portion to transmit the basic data generated by the basic data generation portion; the distribution server includes a second data recording portion to record second data into a second data memory, a service data generation portion to generate service data containing one or more than one second data specified by the first data contained in the basic data transmitted from the transmission portion, and the data to be used in the IC chip contained in the first data, and a data communication portion capable of distributing the service data generated by the service data generation portion to the communication apparatus; and the communication apparatus includes an identification data generation portion to generate identification data, an identification data recording portion to record the identification data generated by the identification data generation portion into an identification data memory, a determination portion to determine whether the prescribed identification data matches with the identification data stored in the identification data memory, and a data acquisition portion to acquire the service data generated by the service data generation portion from the data communication portion if the determination portion determines that the prescribed identification data matches with the identification data stored in the identification data memory.

The above program can cause a hardware resource of a computer including CPU, ROM, RAM or the like to execute the functions of each dement of the information processing server, the distribution server and the communication apparatus described above. It is therefore possible to cause a computer that implements the program to serve as the above-described information distribution system.

According to another embodiment of the present invention, there is provided an information distribution method including the steps of generating identification data in a communication apparatus, recording the identification data generated in the communication apparatus into an identification data memory, receiving a request for transmitting prescribed first data specifying service data generated in a distribution server and distributed to the communication apparatus and containing data to be used in an IC chip capable of contactless communication with a reader/writer, and prescribed identification data in an information processing server, generating basic data containing the requested first data and the prescribed identification data in the information processing server, transmitting the basic data generated in the information processing server from the information processing server, generating service data containing one or more than one second data specified by the first data contained in the basic data transmitted from the information processing server and the data to be used in the IC chip contained in the first data in the distribution server, determining whether the prescribed identification data, matches with the identification data stored in the identification data memory, and distributing the service data generated in the distribution server to the communication apparatus if the prescribed identification data is determined to match with the identification data stored in the identification data memory.

According to the embodiments of the present invention described above, it is possible to distribute service data to a particular communication apparatus only without communication between an information processing server and a distribution server.

BRIEF DESCRIPTION OF THE DRAWINGS

FIG. 5 is a functional block diagram showing the configuration of a PC and an information processing server according to the embodiment.

FIG. 6 is an illustration showing the flow of a screen which is displayed on a display portion of a PC.

FIG. 7 is an illustration showing a specific example of basic data.

FIG. 8 is a functional block diagram showing the configuration of a cellular phone and an item distribution server according to the embodiment.

FIG. 9 is an illustration showing an example of a specific structure of an item.

FIG. 10 is an illustration showing an example of the structure of trading data.

FIG. 11 is an illustration showing the flow of a screen which is displayed on a display portion of a cellular phone.

FIG. 12 is an illustration showing the flow of a screen which is displayed on a display portion of a cellular phone.

FIG. 13 is a flowchart showing the flow of an information distribution method which is performed in the item distribution system according to the embodiment.

DETAILED DESCRIPTION OF THE PREFERRED EMBODIMENTS

Figure 1:
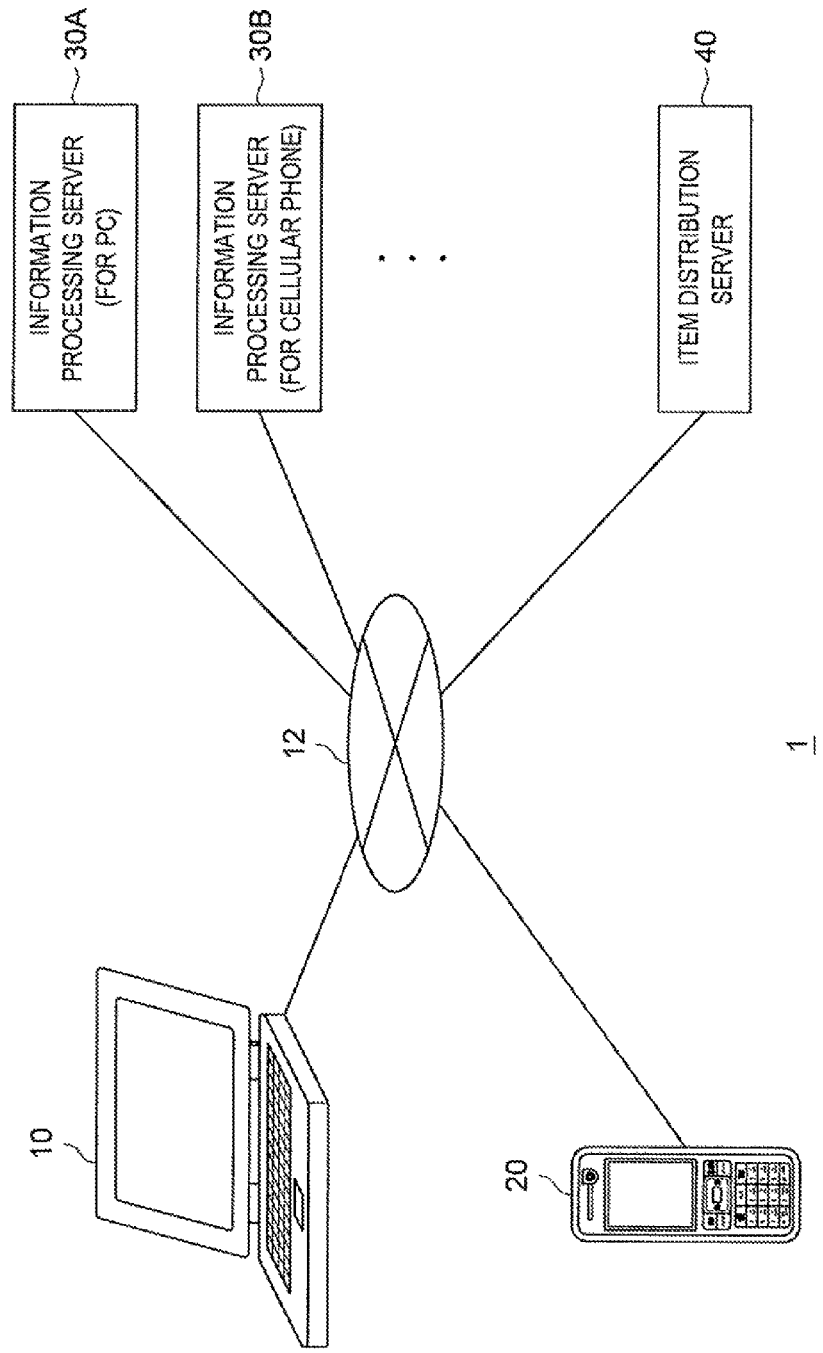
FIG. 1 is an illustration showing the exemplary configuration of an item distribution system according to an embodiment, of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
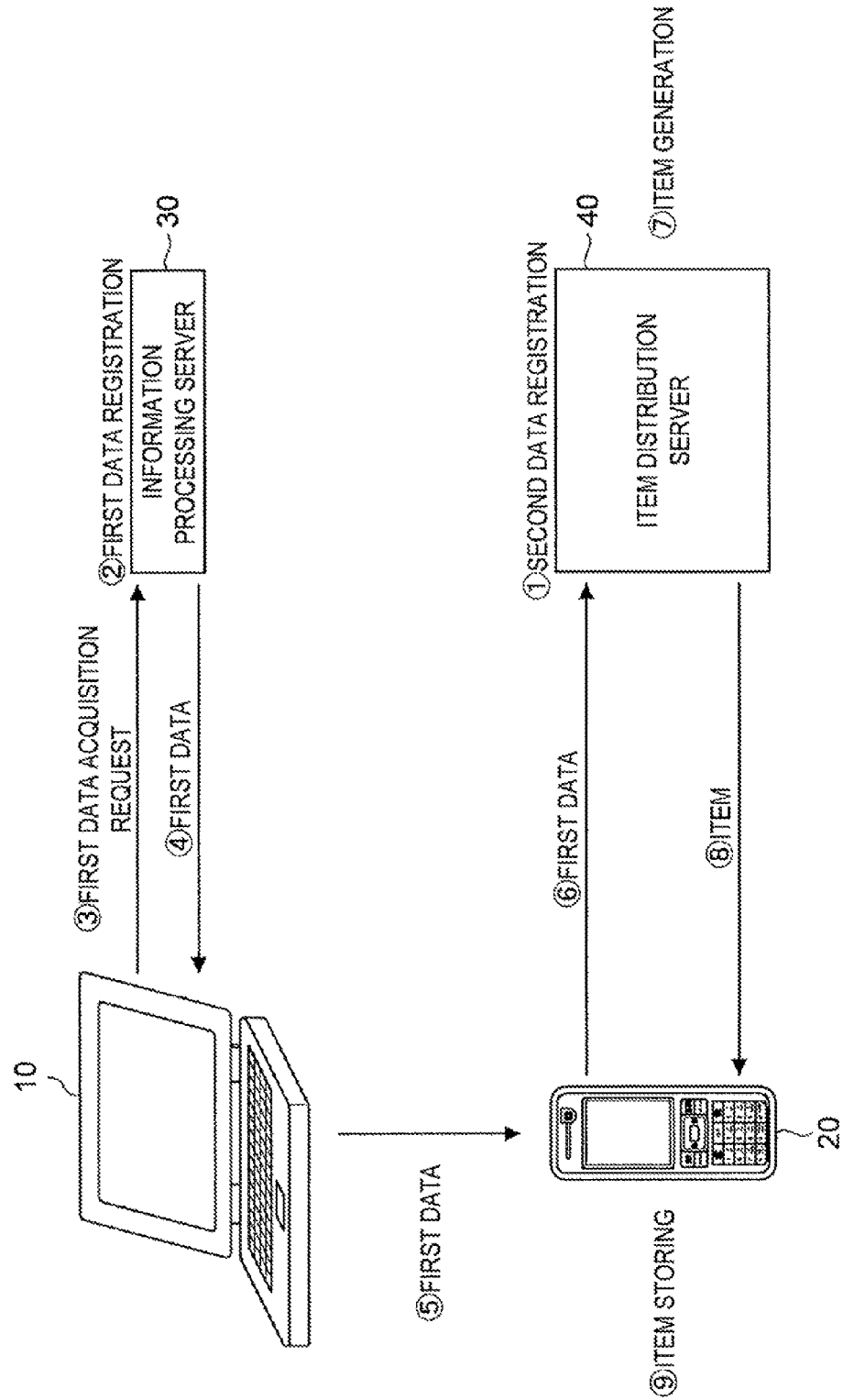
FIG. 2 is an illustration schematically showing the flow of data in the item distribution system.
Figure 3:
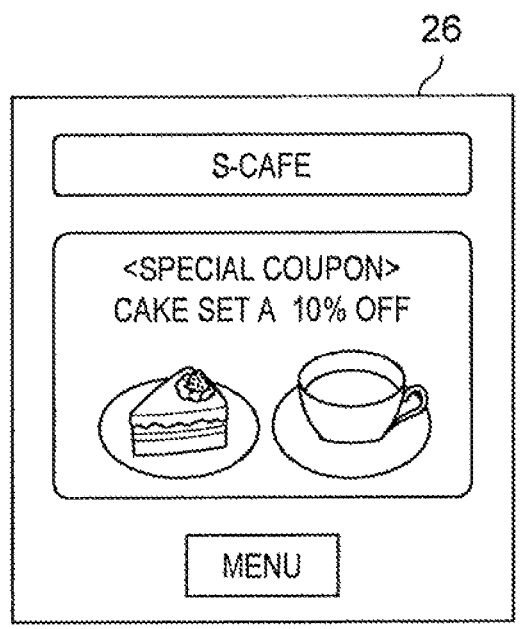
FIG. 3 is an illustration showing an example of an item which is distributed to a cellular phone in the item distribution system.

Preferred embodiments of the present invention will be described in the following order:

(1) Outline of the item distribution system according to the embodiment (2) Hardware configuration of the units constituting the item distribution system (3) Configuration of the PC and the information processing server constituting the item distribution system (4) Configuration of the cellular phone and the item distribution server constituting the item distribution system (5) Example of the operation of the item distribution system (6) Summary (1) Outline of the Item Distribution System According to the Embodiment The outline of an item distribution system 1 according to an embodiment of the present invention is described hereinafter with reference to FIGS. 1 to 3.

FIG. 1 is an illustration showing the exemplary configuration of the item distribution system 1 according to the embodiment. FIG. 2 is an illustration schematically showing the flow of data in the item distribution system 1. FIG. 3 is an illustration showing an example of an item which is distributed to a cellular phone 20 in the item distribution system 1.

Referring FIG. 1, the item distribution system 1, which is an example of an information distribution system of the embodiment, includes a PC (Personal Computer) 10, the cellular phone 20, an information processing server 30A for PC, an information processing server 30B for cellular phone, and an item distribution server 40. The PC 10, the cellular phone 20, the information processing server 30A, the information processing server 30B and the item distribution server 40 are connected through a communication network 12. The communication network 12 may include a wire cable such as a copper wire or a fiber-optic cable, a data transmission line such as a radio wave, or a data relay station such as a router or a base station to control communication.

The PC 10 is connected with the information processing server 30A through a reader/writer 18, so that, it can acquire first data which is used when generating an item described, below from the information processing server 30A through the reader/writer 18.

The information processing server 30A is a server for communicating with the PC 10, and the information processing server 30B is a server for communicating with the cellular phone 20. Hereinafter, they are collectively referred to simply as an information processing server 30 when there is no particular need to distinguish between them. The information processing server 30 has a function to transmit first data to the PC 10 or the cellular phone 20, and it may be installed by a given business.

The item distribution server 40 communicates with the PC 10 or the cellular phone 20, generates an item which is specified by the first data that is received from the PC 10 or the cellular phone 20 and distributes the item to the PC 10 or the cellular phone 20. For example, the item may be data of a ticket, a coupon, a membership card, a point card, a stamp card, an admission card, a credit card, a cash card and so on. In this way, according to the item distribution system 1 of the embodiment, although the first data for generating an item, is distributed from a plurality of information processing servers 30 to the PC 10 or the cellular phone 20, it is only the item distribution server 40 that can generate and distribute an item to the PC 10 or the cellular phone 20.

Note that FIG. 1 shows the PC 10 and the cellular phone 20 as the communication apparatus by way of illustration only. The communication apparatus may be other information processing units such as a home video processing unit (e.g. a DVD recorder, a videocassette recorder etc.), a PHS (Personal Handyphone System), a portable sound processing unit, a portable video processing unit, a PDA (Personal Digital Assistant), a home game device, a portable game device, and an electrical household appliance.

In the above-described item distribution system 1, data is processed and communicated according to the flow shown in FIG. 2, for example. Specifically, firstly, second data is registered in the item distribution server 40 (first stage), and first data is registered in the information processing server 30 (second stage). The first data contains unique data to be used in an IC chip capable of contactless communication which is placed in the cellular phone 20 and data indicating corresponding second data, as described in detail later.

Next, when the PC 10 requests the acquisition of the first: data to the Information processing server 30 (third stage), the information processing server 30 transmits the requested first data to the PC 10 (fourth stage). In this stage, the PC 10 may receive the first data by email or receive a. QR (Quick Response) code which indicates the first data.

Then, when the cellular phone 20 acquires the first data from the PC 10 by a given communication means (fifth stage), the cellular phone 20 transmits the acquired first data to the item distribution server 40 (sixth stage). In response thereto, the item distribution server 40 generates an item which contains the second data that corresponds to the first data received from, the cellular phone 20 and the unique data that is contained in the first data (seventh stage).

After that, the item distribution server 40 transmits the generated item to the cellular phone 20 (eighth stage), and the cellular phone 20 stores the item which is received from the item distribution server 40 (ninth stage). Such an item is displayed on a display portion 26 of the cellular phone 20 as shown in FIG. 3, for example.

When the cellular phone 20 is brought, close to the reader/writer 18 which is located in an S-cafe, for example, with a "special coupon" of "S-cafe" shown in FIG. 3 being displayed on the display portion 26, the cellular phone 20 and the reader/writer 18 may perform contactless communication of the data of the "special coupon".

According to the item distribution system 1 described above, the first data for generating an item is distributed by an unspecified number of information processing servers 30, a final item is generated and distributed by a particular item distribution server 40. However, in the item distribution system 1, the PC 10 can transmit, the first data to any communication apparatus. Hence, there is the possibility that the first data might be transmitted to and further the item might be distributed to a communication apparatus which the information processing server 30 does not intend to. For some kinds of items, it causes an undesired effect if an item is distributed to a communication apparatus which is different from a communication apparatus of a particular user.

In order to avoid this, there is a method of ensuring the validity of a communication apparatus which requests the acquisition of service data by performing communication between each information processing server 30 and the item distribution server 40. However, this method requires the establishment of a secure communication path between each information processing server 30 and the item distribution server 40, which can hamper the proliferation of the system.

In view of the foregoing, the item distribution system 1 of this embodiment has been invented. The item distribution system 1 of the embodiment can distribute service data to the particular cellular phone 20 only without communication between the information processing server 30 and the item distribution server 40. The item distribution system 1 and the detailed configuration of the PC 10, the cellular phone 20, the information processing server 30 and the item distribution server 40 which constitute the item distribution system 1 are described hereinbelow.

(2) Hardware Configuration of the PC, the Cellular Phone and Each Server

Figure 4:
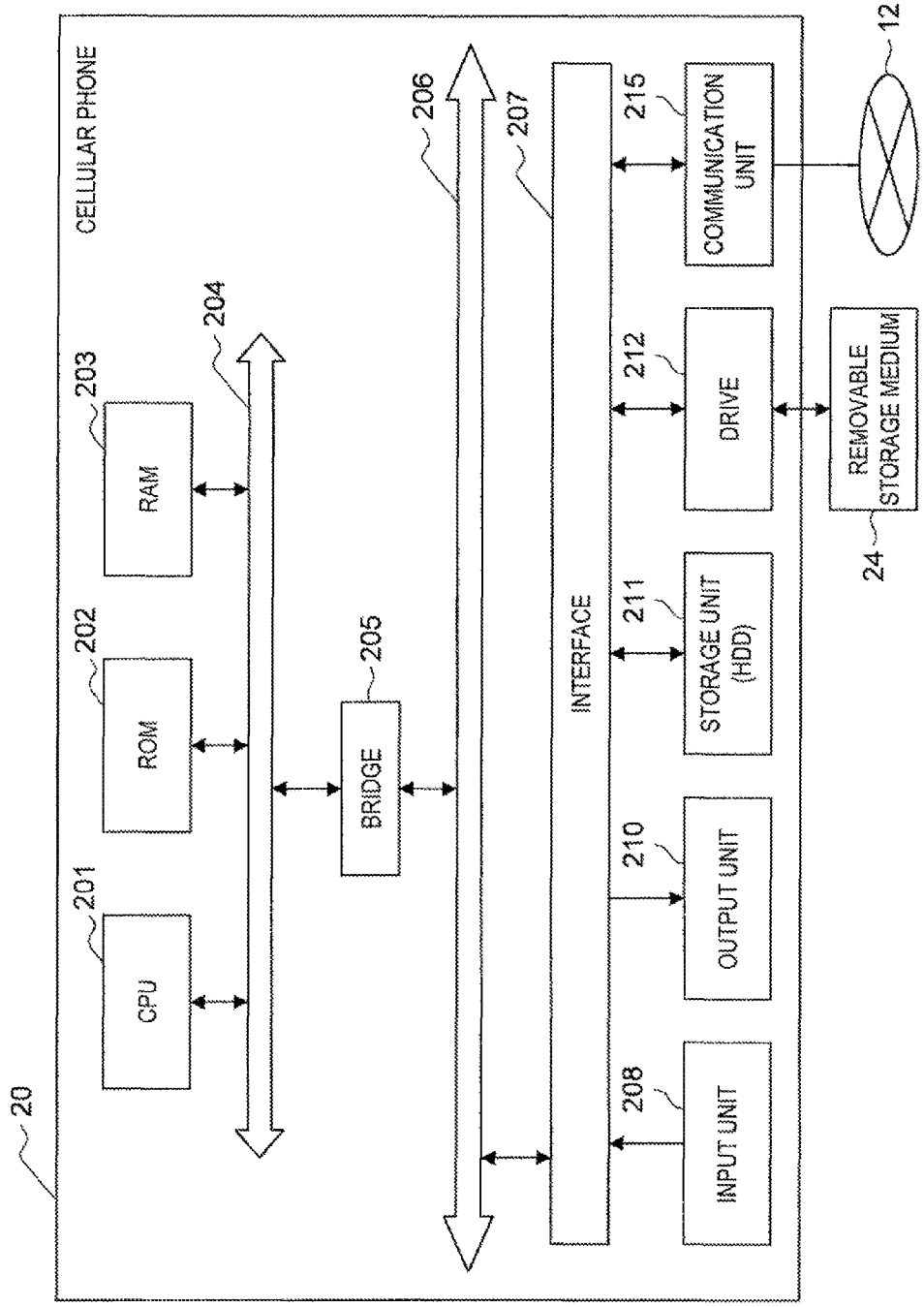
FIG. 4 is an illustration showing an example of the hardware configuration of a cellular phone which constitutes the item distribution system according to the embodiment.

FIG. 4 is an illustration showing an example of the hardware configuration of the cellular phone 20 which constitutes the item distribution system 1 according to the embodiment. The cellular phone 20 includes a CPU (Central Processing Unit) 201, a ROM (Read Only Memory) 202, a RAM (Random Access Memory) 203, a host bus 204, a bridge 205, an external bus 206, an interface 207, an input unit 208, an output unit 210, a storage unit (HDD) 211, a drive 212, and a communication unit 215.

The CPU 201 serves as a processing unit and a control unit, and it controls the overall operation in the cellular phone 20 according to each program. The CPU 201 may be a microprocessor. The ROM 202 stores a program to be used by the CPU 201, a processing parameter and so on. The RAM 203 temporarily stores a program to be used in the execution of the CPU 201, a parameter that varies in the execution and so on. The CPU 201, the ROM 202 and the RAM 203 are connected through the host bus 204, which may be a CPU bus or the like.

The host bus 204 is connected to the external bus 206 such as a PCI (Peripheral Component Interconnect/Interface) bus via the bridge 205. The host bus 204, the bridge 205 and the external bus 206 are not necessarily separated from each other, and their functions may be implemented by one bus.

The input unit 208 may include an input means for a user to input information, such as a mouse, a keyboard, a touch panel, a button, a microphone, a switch or a lever, and an input control circuit to generate an input signal based on a user input and output it to the CPU 201, for example. A user of the cellular phone 20 manipulates the input unit 208 to thereby input various data or instruct processing operation to the cellular phone 20.

The output unit 210 may include a display device such as a CRT (Cathode Ray Tube) display device, an LCD (Liquid Crystal Display) device, an OLED (Organic Light Emitting Display) device or a lamp, and a sound output device such as a speaker or a headphone, for example. The output unit 210 may output reproduced contents. Specifically, the display device displays information such as reproduced video data by a text or an image. The sound output device converts reproduced sound data or the like into a sound and outputs it.

The storage unit 211 is a device for data storage that is configured as an example of a storage portion of the cellular phone 20 according to this embodiment. The storage unit 211 may include a storage medium, a recording device to record data into the storage medium, a reading device to read data from the storage medium, a deleting device to delete data recorded in the storage medium and so on. The storage unit 211 may be an HDD (Hard Disc Drive). The storage unit 211 drives a hard disk and stores a program to be executed by the CPU 201 or various data. The storage unit 211 also stores an item, an identification number and so on as described later.

The drive 212 is a memory reader/writer, and it may be built in the cellular phone 20 or attached externally. The drive 212 reads information that is recorded on a removable memory 24 such as a magnetic disk, an optical disk, a magneto-optical disk or a semiconductor memory which is attached thereto and outputs the information to the RAM 203.

The communication unit 215 may be a communication interface that includes a communication device or the like to establish connection with the communication network 12. The communication unit 215 may be a communication device compatible with a wireless LAN (Local Area Network), a communication device compatible with a wireless USB, or a wire communication device that performs wired communication. The communication unit 215 may transmit/receive data such as basic data and items to/from the PC 10 or the item distribution server 40 through the communication network 12.

An example of the hardware configuration of the cellular phone 20 is described above with reference to FIG. 4. The hardware configuration of the PC 10, the information processing server 30 and the item distribution server 40 are substantially the same as the hardware configuration of the cellular phone 20 and thus not described herein.

(3) Configuration of the PC and the Information Processing Server Constituting the Item Distribution System FIG. 5 is a functional block diagram showing the configuration of the PC 10 and the information processing server 30 according to the embodiment. The PC 10 includes a communication portion 116, a display screen generation portion 120, a display portion 122, an operating portion 124, a basic data request portion 128, a basic data storage portion 132, and a transmission control portion 136. The Information processing server 30 includes a communication portion 316, a first data storage portion 332, a basic data generation portion 334, and a signature adding portion 338.

The communication portion 116 is an interface with the cellular phone 20 and the information processing server 30, and it communicates basic data which contains first data with the cellular phone 20 and the information processing server 30 and transmits identification data to the information processing server 30. The communication portion 116 may include an IC chip which enables contactless communication or may be a communication device which is compatible with a wireless LAN.

The display screen generation portion 120 generates a screen to be displayed on the display portion 122 based on user operation to the operating portion 124 or data received from the information processing server 30. For example, the display screen generation portion 120 generates a basic data request screen, an identification number input screen, an email sending screen and so on. The display portion 122 displays the screen which is generated by the display screen generation portion 120.

The operating portion 124 is an interface through which a user inputs data or instruction to the PC 10. For example, a user may input an identification number through the operating portion 124 when the display portion 122 displays an identification number input, screen.

The basic data request portion 128 requests the transmission of basic data to the information, processing server 30 according to the user operation to the operating portion 124. Specifically, the basic data request portion 128 transmits to the information processing server 30 a request for transmitting first data for generating a desired item and an identification number which is input to the operating portion 124.

The basic data storage portion 132 is a storage medium which stores basic data that is acquired from the information processing server 30 by the basic data request portion 128. The basic data storage portion 132 may be nonvolatile memory such as EEPROM (Electrically Erasable Programmable Read-Only Memory) and EPROM (Erasable Programmable Read-Only Memory), magnetic disks such as hard disk and discoid magnetic disk, optical disks such as CD-R (Compact Disc Recordable)/RW (Rewritable), DVD-R (Digital Versatile Disk Recordable)/RW/+R/+RW/RAM (Random Access Memory) and BD (Blu-ray Disc (registered trademark))-R/BD-RE, or a storage medium such as MO (Magneto Optical) disk.

The transmission control, portion 136 controls the transmission of the basic data which is stored in the basic data storage portion 132 from the communication portion 116 to the cellular phone 20. For example, the transmission control portion 136 makes control so as to transmit the basic data which is stored in the basic data storage portion 132 from the communication portion 116 to the cellular phone 20 when the user operation that instructs the transmission of the basic data, to the cellular phone 20 is input to the operating portion 124.

The communication portion 316 of the information processing server 30 is an interface with the PC 10 and it serves as a reception portion and a transmission portion. For example, the communication portion 316 receives a request for transmitting first data or basic data from the PC 10 or transmits the basic data that is generated by the basic data generation portion 334 to the PC 10.

The first data storage portion 332 stores the first data which contains the data that specifies the second data constituting an item and the unique data thai is used in an IC chip capable of contactless communication. Like the basic data storage portion 132, the first data storage portion 332 may be nonvolatile memory such as EEPROM and EPROM, magnetic disks such as hard disk and discoid magnetic disk, optical disks such as CD-R/RW, DVD-R/RW/+R/+RW/RAM and BD (Blu-ray Disc (registered trademark))-R/BD-RE, or a storage medium, such as MO disk.

When the communication portion 316 receives a first data transmission request and an identification number from the PC 10, the basic data generation portion 334 generates basic data which contains the requested first data and the identification number. Further, the signature adding portion 338 adds a signature which proves the validity of at least the identification number to the basic data.

Specifically, the information processing server 30 and the item distribution server 40 may have a common key in advance, and the signature adding portion 338 may add the data obtained by encrypting the identification number using the common key as a signature to the basic data. In such a configuration, it is possible to detect if there has been tampering with an identification number which is contained in basic data based on whether the data obtained by decrypting the signature contained in the basic data using the common key in the item distribution server 40 matches with the identification number which is contained in the basic data.

The information processing server 30 and the item distribution server 40 may have two or more sets of common keys: one is a common key for use and one is a spare common key. In this configuration, even if a common key in use is leaked out, a signature can be added using a spare common key, thereby allowing secure and continued provision of a service.

The basic data which is generated by the basic data generation portion 334 is transmitted to the PC 10 through the communication portion 316. Then, the PC 10 transmits the basic data to the cellular phone 20 in response to the input of a basic data transmission instruction to the operating portion 124. The flow of the screen which is displayed on the display portion 122 after the request for basic data by the PC 10 until the transmission of the basic data to the cellular phone 20 is described hereinbelow.

FIG. 6 is an illustration showing the flow of the screen which is displayed on the display portion 122 of the PC 10. First, the display screen generation portion 120 generates a screen for acquiring a coupon of the S-cafe based on the data which is received from the information processing server 30 and displays the coupon acquisition screen of the S-cafe on the display portion 122 as shown in FIG. 6A. When a user selects an acquisition button 51 on the screen shown in FIG. 6B through the operating portion 124, the display screen generation portion 120 generates a screen for inputting an identification number and displays the identification number input screen on the display portion 122 as shown in FIG. 6B.

A user can input an identification number to an identification number input frame 52 on the identification number input screen shown in FIG. 6B through the operating portion 124. If a user inputs the identification number which is generated in his/her own cellular phone 20, the item (item a) can be acquired only in the user's cellular phone 20.

When the identification number is input, the communication portion 116 receives the basic data which contains the input identification number from the information processing server 30. The display screen generation portion 120 generates a screen for instructing the transmission of the basic data which is received from the information processing server 30 and displays the basic data transmission instruction screen on the display portion 122 as shown in FIG. 6C. When a user selects a mailer starting link 53 which is included in the basic data transmission instruction screen, the display screen generation portion 120 generates a screen for sending basic data by email and displays the basic data email sending screen on the display portion 122 as shown in FIG. 6D.

For example, the display screen generation portion 120 generates the email sending screen in which the destination is the address of the cellular phone 20, the subject is "Acquisition of item a", and the body includes the text "Please select the following URL to acquire the item a" and basic data 54. A specific example of the basic data which is generated by the basic data generation portion 334 of the information processing server 30 is described hereinafter with reference to FIG. 7.

FIG. 7 is an illustration showing a specific example of the basic data. The basic data contains address information 61 which indicates the location of the item distribution server 40, designation data 62 which indicates the corresponding second data, unique data 63 which is used by an IC chip capable of contactless communication, a title 64 of the item which is generated based on the basic data, detailed information 65 of the item which is generated based on the basic data, an identification number 66 and a signature 67, which are described, in the markup language.

Specifically, FIG. 7 shows the case where the address information 61 is "teikyouserver.jp". The designation data 62 contains "000001" as a service ID to identify the information processing server 30, "0024" as an item ID to identify an item, "C" indicating a coupon as a category ID to identify the category of an item, and "1" as a restrictive regulation to restrict the number of times of redistribution allowed for the item. The service ID and the item ID specify the second data which is used for the item to be generated in the item distribution server 40.

FIG. 7 shows the case where the unique data is "303E400A". The unique data is communicated between an IC chip and the reader/writer 18. If the reader/writer 18 previously knows that the unique data "303E400A" indicates a coupon for 10% off a cake set A, for example, the reader/writer 18 operates to give a discount of 10% on the cake set A when it receives the unique data "303E400A".

FIG. 7 further shows the case where the title 64 is "<special coupon>", and the detailed information 65 is "cake set A 10% off".

FIG. 7 shows the case where the identification number 66 is "0901". This identification number is the number which is input by a user on the identification number input screen shown in FIG. 6A. The signature 67 is a hash value "mrchfeik" of the identification number 66 or the entire basic data in this case.

As described above, the basic data contains the first data such as the designation data 62 and the unique data 63 to be used for generating an item, the identification number 66 to distribute an item to the particular cellular phone 20 only, and the signature 67 to prove the validity of the identification number 66.

(4) Configuration of the Cellular Phone and the Item Distribution Server Constituting the Item Distribution System The configuration of the cellular phone 20 and the item distribution server 40 according to the embodiment is described hereinafter.

FIG. 8 is a functional block diagram showing the configuration of the cellular phone 20 and the item distribution server 40 according to the embodiment. As shown in FIG. 8, the cellular phone 20 includes a communication portion 216, a display screen generation portion 220, a display portion 26, an operating portion 224, an identification number generation portion 228, a storage portion 232, an item acquisition portion 236, and a determination portion 240. The item distribution server 40 includes a communication portion 416, an item generation portion 424, a signature verification portion 428, a storage portion 432, a target metacode generation portion 434, and an item distribution portion 436.

The communication portion 216 is an interface with the PC 10 and the item distribution server 40, and it serves as a basic data reception portion to receive basic data from the PC 10, for example. Further, the communication portion 216 communicates basic data, a target metacode, an item and so on with the item distribution server 40. The communication portion 216 may include an IC chip capable of contactless communication. The communication portion 216 and the reader/ writer 18 can contactlessly communicate with each other using a magnetic field of a particular frequency (e.g. 13.56 MHz).

The display screen generation portion 220 generates a display screen based on the information which is received form the PC 10 or the item distribution server 40 and displays the screen on the display portion 26. For example, the display screen generation portion 220 generates a screen for displaying basic data that is received from the PC 10, a screen for selecting a target metacode which is described later, a result screen for indicating whether an item is successfully acquired or not and so on and displays the generated screen on the display portion 26.

The operating portion 224 is an interface for a user to input an instruction or data to the cellular phone 20. For example, a user may input an instruction for generating an identification number or an instruction for acquiring an item through the operating portion 224.

The identification number generation portion 228 generates an identification number, which is an arbitrary 4-digit number, as identification data. The identification number generation portion 228 may generate a random identification number based on a current time, for example.

The storage portion 232 serves as an identification data storage portion which stores the identification number that is generated by the identification number generation portion 228 and the item that is acquired by the item acquisition portion 236. Like the basic data storage portion 132 of the PC 10, the storage portion 232 may be nonvolatile memory such as EEPROM and EPROM, magnetic disks such as hard disk and discoid magnetic disk, optical disks such as CD-R/RW, DVD-R/RW/+R/+RW/RAM and BD (Blu-ray Disc (registered trademark))-R/BD-RE, or a storage medium, such as MO disk.

The item acquisition portion 236 performs a series of process to acquire an item from the item distribution server 40 based on the basic data which is received from the PC 10 through the communication portion 216. For example, the item acquisition portion 236 transmits the basic data to the item distribution server 40 and receives a target metacode to be exchanged with the item that is generated in the item distribution server 40. Then, the item acquisition portion 236 transmits the target metacode as an item acquisition request to the item distribution server 40 according to user operation and acquires the item in exchange for the target metacode from the item distribution server 40.

The communication portion 416 of the item distribution server 40 is an interface with the cellular phone 20, and it serves as a data communication portion which communicates basic data, a target metacode, an item and so on with the cellular phone 20.

The item generation portion 424 serves as a service data generation portion which generates an item based on the basic data that is received from the cellular phone 20 through the communication portion 416. For example, the item generation portion 424 generates an item which contains the second data that is specified by the first data contained in the basic data and the unique data that is contained in the first data and used in an IC chip capable of contactless communication.

The second data may contain display data (e.g. XML template data) which specifies the layout or the like of the item to be displayed on the display portion 26 of the cellular phone 20 and item control data such as item overwrite control and a storage rule that specifies a storage location in the cellular phone 20. Even if the second data of the embodiment is static data which is prestored in the storage portion 432, the second data may be added, changed or deleted as appropriate. A specific example of the item which contains the second data and the unique data is described hereinafter with reference to FIG. 9.

FIG. 9 is an illustration showing an example of the specific structure of an item. FIG. 9 shows an example of the item which is generated based on the basic data of FIG. 7. For example, the item generation portion 424 interprets the basic data shown in FIG. 7 and selects the second data which is specified by the service ID "000001", the item ID "0024" and the category ID "C" that are contained in the designation data 62 from the storage portion 432. Further, the item generation portion 424 generates the item in which the unique data "303E400A", the title "<special coupon>", the detailed information "cake set. A 10% off" are buried in the selected second data as shown in FIG. 9.

The item which is generated by the item generation portion 424 in this manner is stored into the storage portion 432. Although FIG. 8 shows the case where the storage portion 432 has both a function as a second data storage portion to store second data and a function to store an item, the storage portion 432 may be composed of a plurality of storage media in practice.

The item generation portion 424 generates an item only when the signature verification portion 428 validates the identification number which is contained in the basic data that is received from the cellular phone 20. The signature verification portion 428 decrypts the signature 67 which is contained in the basic data using a common key with the information processing server 30 and determines that the identification number 66 or the basic data is valid if the decrypted data matches with the identification number 66 or the basic data.

In such a configuration, an item is not generated in the event of tampering with the identification number 66 which is contained in the basic data, thereby reducing the possibility of distributing an item to the cellular phone 20 which the information processing server 30 does not intend to.

The target metacode generation portion 434 serves as a service data generation portion which generates trading data to be exchanged with the item that is generated by the item generation portion 424. The trading data contains a target metacode which indicates an item to be exchanged and an identification number which is contained in the basic data that is used as a basis for generating an item by the item generation portion 424. The trading data which is generated by the target metacode generation portion 434 is transmitted to the cellular phone 20 through the communication portion 416. A specific example of the trading data is described hereinafter with reference to FIG. 10.

FIG. 10 is an illustration showing an example of the structure of trading data. As shown in FIG. 10, the trading data contains activation data 71, a target metacode 72 and an identification number 73. The activation data 71 is data to activate an item acquisition function in the item acquisition portion 236 of the cellular phone 20. The item acquisition portion 236 which is activated by the activation data 71 performs a series of the item acquisition function from the request for item acquisition to the storing of an acquired item into the storage portion 232. Thus, if the item acquisition portion 236 is secured, it is possible to ensure the safety in the process of the item acquisition.

The target metacode 72 is data which indicates an item to be exchanged as described earlier. FIG. 10 shows the case where the value of the target metacode 72 is "pM1FGkq". The value of the target metacode 72 according to the embodiment may be set to an arbitrary character string which is generated based on metadata by the target metacode generation portion 434, for example.

Specifically, the hash value which is calculated by the target metacode generation portion 434 based on the metadata that is generated by the item generation portion 424 may be set as the value of the target metacode 72. Alternatively, a random number which is generated by the target metacode generation portion 434 using a given means may be set as the value of the target metacode 72.

The storage portion 432 stores the item which is generated by the item generation portion 424 in association with the value of the target metacode 72 as described above.

The identification number 73 is an identification number which is contained in basic data as a basis for generating an item in the item generation portion 424. In FIG. 10, it is the same value, i.e. "0901", as the identification number 66 which is contained in the basic data shown in FIG. 7.

Back to the description of the configuration of the cellular phone 20 referring to FIG. 8, the determination portion 240 determines whether the identification number 73 which is contained in the trading data matches with the identification number which is stored in the storage portion 232. If the determination portion 240 determines that they match, it approves the item acquisition request (the transmission of a target metacode) from the item acquisition portion 236. In this example, the determination portion 240 approves the item acquisition request from the item acquisition portion 236 when the identification number which is stored in the storage portion 232 is "0901".

When the determination portion 240 determines that the identification number 73 which is contained in the trading data and the identification number which is stored in the storage portion 232 match, the item acquisition portion 236, which has received the trading data from the item distribution server 40, transmits at least the target metacode 72 which is contained in the trading data as an item acquisition request to the item distribution server 40.

The item distribution portion 436 of the item distribution server 40 serves as a data communication portion which receives the target metacode 72 from the mobile phone 20, extracts the item which corresponds to the target metacode 72 from the storage portion 432, and distributes the extracted item to the cellular phone 20.

As described in the foregoing, in the item distribution system 1 of this embodiment, only the mobile phone 20 which stores the identification number that matches with the identification number contained in the trading data transmitted from the item distribution server 40 can acquire the relevant item from the item distribution server 40.

FIGS. 11 and 12 are illustrations showing the flow of the screen which is displayed on the display portion 26 of the cellular phone 20. First, when the communication portion 216 receives basic data from the PC 10 by email, the display screen generation portion 220 generates a screen for displaying basic data and displays the basic data display screen on the display portion 26 as shown in FIG. 11A.

When basic data 27 on the screen shown in FIG. 11A is selected by a user through the operating portion 224, the item acquisition portion 236 transmits basic data to the item distribution server 40 and receives trading data from the item distribution server 40. Then, the display screen generation portion 220 generates a screen for selecting a target metacode and displays the target metacode selection screen on the display portion 26 as shown in FIG. 11B.

When a target metacode 28 on the screen shown in FIG. 11B is selected by a user through the operating portion 224, the determination portion 240 determines whether the identification number which is contained in the trading data matches with the identification number which is stored in the storage portion 232. If the determination portion 240 determines that they match, the item acquisition portion 236 transmits the target metacode 28 to the item distribution server 40 and acquires the item corresponding to the target metacode 28 from the item distribution server 40. Then, the display screen generation portion 220 generates a result screen which indicates that the acquisition of the item has been successful and displays the result screen indicating the successful acquisition of the item on the display portion 26 as shown in FIG. 11C.

On the other hand, if the determination portion 240 determines that the identification number which is contained in the trading data does not match with the identification number which is stored in the storage portion 232, the item acquisition portion 236 fails to acquire the item from the item distribution server 40. In this case, the display screen generation portion 220 generates a result screen which indicates that the acquisition of the item has been unsuccessful and displays the result screen indicating the unsuccessful acquisition of the item on the display portion 26 as shown in FIG. 12C.

The identification number which is stored in the storage portion 232 may be invalidated once it is used for the item acquisition by the item acquisition portion 236. In such a configuration, when the cellular phone 20 which has stored the identification number that is contained in the trading data tries to acquire the item for the second time, the determination portion 240 determines that the valid identification number which matches with the identification number that is contained in the trading data is not stored in the storage portion 232. As a result, the item acquisition portion 236 fails to acquire the item from the item distribution server 40. In this case also, the display screen generation portion 220 generates a result screen which indicates that the acquisition of the item has been unsuccessful and displays the result screen indicating the unsuccessful acquisition of the item on the display portion 26 as shown in FIG. 12C.

(5) Example of the Operation of the Item Distribution System

The configuration of the item distribution system 1 according to the embodiment is described in the foregoing. An information distribution method which is performed in the item distribution system 1 is described hereinafter with reference to FIG. 13.

FIG. 13 is a flowchart showing the flow of an information distribution method which is performed in the item distribution system 1 according to the embodiment. First, the identification number generation portion 228 of the cellular phone 20 generates an identification number (S504), and the storage portion 232 stores the identification number which is generated by the identification number generation portion 228 (S506).

Next, a user views the identification number which is generated by the identification number generation portion 228 and inputs the identification number into the PC 10. The basic data request portion 128 transmits the input identification number and the basic data acquisition request to the information processing server 30 (S508). Then, the basic data generation portion 334 of the information processing server 30 generates basic data which contains first data, the identification number and a signature (S512) and transmits the basic data, to the PC 10 through the communication portion 316 (S516).

Then, the transmission control portion 136 of the PC 10 transmits the basic data which is received from the information processing server 30 to the cellular phone 20 through the communication portion 116 according to user operation (S520). The cellular phone 20 receives the basic data from the PC 10 and transmits the basic data to the item distribution server 40 according to user operation (S524).

When the item distribution server 40 receives the basic data from the cellular phone 20, the signature verification portion 428 checks the validity of the basic data based on the signature which is contained in the basic data (S528). If the signature verification portion 428 verifies the validity of the basic data, the item generation portion 424 generates an item based on the basic data, and the target metacode generation portion 434 generates trading data which contains a target metacode to be exchanged with the item, activation data and the identification number (S532).

After that, the item distribution server 40 transmits the trading data which is generated by the target metacode generation portion 434 to the cellular phone 20 (S536). The cellular phone 20 activates the item acquisition function in the item acquisition portion 236 and the determination portion 240 based on the activation data which is contained in the trading data that is received from the item distribution server 40, and the determination portion 240 determines whether the identification number which is contained in the trading data matches with the identification number which is stored in the storage portion 232 (S540).

If the determination portion 240 determines that the identification number which is contained in the trading data matches with the identification number which is stored in the storage portion 232, the item acquisition portion 236 transmits the target metacode which is contained in the trading data to the item distribution server 40 (S544). Then, the item distribution portion 436 of the item distribution server 40 distributes the item which corresponds to the target metacode that is received from the cellular phone 20 to the cellular phone 20 (S548).

Receiving the item from the item distribution server 40, the cellular phone 20 stores the distributed item into the storage portion 232 and uses the item which is stored in the storage portion 232 according to need (S552).

(6) Summary

As described in the foregoing, in the item distribution system 1 according to the embodiment, the item acquisition portion 236 can acquire the item which is generated based on the first data in the item distribution server 40 if the determination portion 240 determines that the identification number which is transmitted together with the first data transmission request to the information processing server 30 matches with the identification number which is generated by the identification number generation portion 228 of the cellular phone 20. On the other hand, if the determination portion 240 determines that the identification number which is transmitted to the information processing server 30 is different from the identification number which is generated by the identification number generation portion 228 of the cellular phone 20, the cellular phone 20 fails to acquire the item from the item distribution server 40.

Thus, only the cellular phone 20 which generates and stores the identification number that is transmitted together with the first data transmission request to the information processing server 30 can acquire the item which is generated based on the first data from the item distribution server 40. The item distribution system 1 can thereby distribute the item to the particular cellular phone 20 only without communication between the information processing server 30 and the item distribution server 40.

Further, the information processing server 30 transmits the basic data which contains the identification number, so that the item distribution system 1 can distribute the item to the cellular phone 20 depending on whether the identification number which is contained in the basic data is generated by the cellular phone 20, regardless of the communication path through which the basic data is transmitted to the cellular phone 20.

Furthermore, in the item distribution system 1 according to the embodiment, the signature verification portion 428 of the item distribution server 40 checks the validity of the identification number as to whether the identification number which is contained in the basic data has been tampered or the like and, if the signature verification portion 428 verifies the validity of the identification number, the item generation portion 424 generates the item based on the first data which is contained in the basic data. Therefore, the item is not generated if the identification number which is contained in the basic data has been tampered, thereby reliably preventing the item from being distributed to the cellular phone 20 which the information processing server 30 does not intend to.

It should be understood by those skilled in the art that various modifications, combinations, sub-combinations and alterations may occur depending on design requirements and other factors insofar as they are within the scope of the appended claims or the equivalents thereof.

For example, although the above embodiment describes the case where the PC 10 transmits the identification number which is generated by the cellular phone 20 to the information processing server 30, the information processing server 30 generates the basic data which contains the identification number, and the item which is generated based on the basic data is eventually distributed only to the cellular phone 20 that has generated the identification number contained in the basic data, the present invention is not limited to such a case.

As an alternative embodiment, the system may be configured so that, the PC 10 transmits individual information (e.g. SIM (Subscriber Identity Module) code) which is given to the cellular phone 20 to the information processing server 30, the information processing server 30 generates basic data which contains the individual information, and the item which is generated based on the basic data is eventually distributed only to the cellular phone 20 to which the individual information that is contained in the basic data is given. In this configuration also, it is possible to distribute the item only to the particular cellular phone 20 or the cellular phone 20 owned by a particular user without communication between the information processing server 30 and the item distribution server 40.

Further, although the above embodiment describes the case where the item generation portion 424 does not generate the item if the signature verification portion 428 of the item distribution server 40 determines that the identification number which is contained in the basic data that is received from the cellular phone 20 is not valid, the present invention is not limited to such a case. For example, the system may be configured so that the item generation portion 424 generates the item while the signature verification portion 428 determines the validity of the identification number and, if the signature verification portion 428 determines that the identification number which is contained in the basic data that is received from the cellular phone 20 is not valid, the trading data or the item is not distributed to the cellular phone 20.

Furthermore, although the above embodiment describes the case where the cellular phone 20 can acquire the item if the identification number which is generated by the cellular phone 20 matches with the identification number which is contained in the basic data, the present invention is not limited to such a case. For example, the system may be configured so that the item distribution server 40 manages the period of distributing an item or the number of times of distributing an item or the information processing server 30 generates and transmits the basic data which contains an item distribution condition such as the period of distributing an item or the number of times of distributing an item, and the cellular phone 20 can acquire the item if the identification number which is generated by the cellular phone 20 matches with the identification number which is contained in the basic data and if the item distribution condition such as the period of distributing an item or the number of times of distributing an item is satisfied.

Although FIG. 8 shows the storage portion 232 of the cellular phone 20 in one block, the storage portion 232 of the cellular phone 20 may be separated depending on data content to be stored. For example, the storage portion 232 may include a storage medium which stores the data to be used in an IC chip and contained in an item, a storage medium which stores the data (e.g. the second data) that is different from the data to be used in an IC chip and contained in an item, and a storage medium which stores the identification number that is generated by the identification number generation portion 228.

Further, although the above embodiment uses the identification number which is composed of 4-digit number as an example of the identification data, the present invention is not limited thereto. For example, the identification data may be fingerprint data of a user, and the cellular phone 20 may acquire the item of the fingerprint data which is stored in the storage portion 232 and the fingerprint data which is contained in the basic data match or are similar to each other.

Alternatively, the identification data may be IC card data which is stored in an IC card. In this case, the storage portion 232 stores the IC card data of the IC card which is brought close thereto, and the cellular phone 20 acquires the item if the IC card data which is stored in the storage portion 232 matches with the IC card data which is contained in the basic data. Likewise, the identification data may be voice data of a user, retina data which indicates the pattern of a user's retina, or face data which indicates the shape of a user's face.

Further, it is not necessary to perform each step in the process of the item distribution system 1 in chronological order according to the sequence shown in the sequence chart, and the processing which is performed in parallel or individually (e.g. parallel processing or object processing) may be included.

Furthermore, it is possible to create a computer program that causes the hardware such as the CPU 101, the ROM 102 or the RAM 103 which are built in the PC 10, the cellular phone 20, the information processing server 30 or the item distribution server 40 to perform the equal function to each configuration of the PC 10, the cellular phone 20, the information processing server 30 or the item distribution server 40. Further, a storage medium which stores such a computer program may be provided. It is also possible to integrate the functions such as the display screen generation portion 220, the identification number generation portion 228, the item acquisition portion 236 and the determination portion 240 of the cellular phone 20 into one integrated circuit.

What is claimed is:

1. An information distribution system comprising:
a communication apparatus having an integrated circuit (IC) chip capable of contactlessly communicating with a reader/writer;
an information processing server to transmit first data for generating service data containing unique data to be transmitted from the IC chip to the reader/writer; and
a distribution server to generate and distribute the service data to the communication apparatus, wherein the information processing server includes:
a reception portion receiving a message comprising first identification data input by a user and a request for transmitting the first data, the first data containing the unique data and specifying the service data to be generated in the distribution server;
a basic data generation portion generating basic data containing the first data and the first identification data; and
a transmission portion transmitting the basic data to the communication apparatus, the distribution server includes:
a second data storage portion to store second data;
a service data generation portion generating service data containing one or more than one piece of second data and the unique data; and
a data communication portion capable of distributing the service data to the communication apparatus, and the communication apparatus includes:
a basic data reception portion receiving the basic data transmitted from the information processing server through a given communication path;
an identification data storage portion storing the first identification data input by the user;
a determination portion determining whether second identification data transmitted from the distribution server matches with the first identification data stored in the identification data storage portion; and
a data acquisition portion acquiring the service data from the distribution server after the determination portion determines that the first identification data matches with the second identification data, wherein the second identification data is transmitted, before the service data, from the distribution server to the communication apparatus.

2. The information distribution system according to claim 1, wherein
the basic data generation portion adds a signature to the basic data to prove validity of at least the first identification data,
the distribution server further includes a signature verification portion to verify validity of the first identification data based on the signature added to the basic data, and
the service data generation portion generates the service data if the signature verification portion verifies that the first identification data is valid.

3. The information distribution system according to claim 1, wherein
the communication apparatus further includes:
a basic data transmission portion to transmit the basic data received by the basic data reception portion to the distribution server,
the service data generation portion generates the service data and trading data based on the basic data received from the information processing server through the communication apparatus, the trading data indicating the service data and containing the second identification data,
the data communication portion distributes the trading data to the communication apparatus,
the determination portion determines whether the second identification data contained in the trading data matches the first identification data stored in the identification data storage portion, the data acquisition portion transmits the trading data to the distribution server after the determination portion determines that the first identification data matches the second identification data, and upon receiving the trading data from the communication apparatus, the data communication portion distributes service data to the communication apparatus.

4. An information processing server comprising:

a reception portion receiving a message comprising first identification data input by a user and a request for transmitting first data, the first data specifying service data to be generated in a distribution server and to be distributed to a communication apparatus and containing unique data to be transmitted contactlessly from an integrated circuit (IC) chip to a reader/writer;

a basic data generation portion to generate basic data containing the requested first data and the first identification data; and a transmission portion to transmit the basic data to the communication apparatus though a network, wherein the service data generated based on the basic data in the distribution server is distributed to the communication apparatus after second identification data stored in the communication apparatus matches the first identification data transmitted from the distribution server.

5. A distribution server to generate service data containing unique data to be contactlessly transmitted from an integrated circuit (IC) chip to a reader/writer, and to distribute the service data to a communication apparatus, the distribution server comprising:

a data communication portion to receive basic data generated by an information processing server, the basic data being generated after the information processing server receives a message comprising first identification data input by a user and a request for transmitting first data, the basic data containing the first data and the first identification data, the first data containing the unique data and specifying the service data;

a second data storage portion to store second data; and a service data generation portion to generate service data containing one or more than one piece of second data specified by the first data and the unique data, wherein the service data is distributed from the data communication portion to the communication apparatus after the distribution server receives a signal transmitted from the communication apparatus indicating the second identification data stored in the communication apparatus matching the first identification data transmitted from the distribution server.

6. A communication apparatus communicating with a distribution server which generates service data, the communication apparatus comprising:

a basic data reception portion to receive basic data from an information processing server through a given communication path, the basic data being generated after the information processing server receives a message comprising first identification data input by a user and a request for transmitting first data, the basic data containing the first data and the first identification data, the first data specifying service data to be generated in the distribution server and containing unique data to be contactlessly transmitted from an integrated circuit (IC) chip to a reader/writer;

an identification data storage portion storing the first identification data input by the user;

a determination portion to determine whether second identification data transmitted from the distribution server matches the first identification data stored in the identification data storage portion; and a data acquisition portion to acquire the service data generated based on the basic data in the distribution server from the distribution server after the determination portion determines that the second identification data matches the first identification data stored in the identification data storage portion, wherein the second identification data is transmitted, before the service data, to the communication apparatus.

7. A computer-readable medium tangibly storing a program for causing a computer system to serve as an information distribution system, the information distribution system comprising:

a communication apparatus having an integrated circuit (IC) chip capable of contactlessly communicating with a reader/writer;

an information processing server to transmit first data for generating service data containing unique data to be transmitted from the IC chip to the reader/writer; and a distribution server to generate and distribute the service data to the communication apparatus, wherein the information processing server includes:

a reception portion receiving a message comprising first identification data input by a user and a request for transmitting the first data, the first data containing the unique data and specifying the service data to be generated in the distribution server;

a basic data generation portion to generate basic data containing the first data and the first identification data; and a transmission portion to transmit the basic data, the distribution server includes:

a second data recording portion to record second data into a second data memory;

a service data generation portion to generate service data containing one or more than one piece of second data and the unique data; and a data communication portion capable of distributing the service data to the communication apparatus, and the communication apparatus includes:

a basic data reception portion receiving the basic data transmitted from the information processing server through a given communication path;

an identification data recording portion recording the first identification data input by the user;

a determination portion to determine whether second identification data transmitted from the distribution server matches with the first identification data stored in the identification data recording portion; and a data acquisition portion to acquire the service data from the distribution server after the determination portion determines that the first identification data matches with the second identification data, wherein the second identification data is transmitted, before the service data, from the distribution server to the communication apparatus.

8. An information distribution method comprising the steps of:

receiving first identification data in a communication apparatus;

recording the first identification data into an identification data memory;

receiving, in an information processing server, a message comprising second identification data input by a user and a request for transmitting first data, the first data specifying service data to be generated in a distribution server and to be distributed to the communication apparatus, the first data containing unique data to be contactlessly transmitted from an integrated circuit (IC) chip to a reader/writer;

generating, in an information processing server, basic data containing the first data and the second identification data;

transmitting the basic data from the information processing server to the distribution server;

generating, in the distribution server, service data containing one or more than one piece of second data specified by the first data and the unique data;

determining whether the second identification data input by the user matches the first identification data stored in the identification data memory; and distributing the service data from the distribution server to the communication apparatus after the second identification data is determined to match the first identification data stored in the identification data memory.

* * * * *